United States Patent
Shiozaki et al.

(10) Patent No.: US 9,062,765 B2
(45) Date of Patent: *Jun. 23, 2015

(54) SHIFT CONTROL DEVICE FOR VEHICLE TRANSMISSION

(75) Inventors: Tomoo Shiozaki, Wako (JP); Yoshihisa Kanno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1297 days.

This patent is subject to a terminal disclaimer.

(21) Appl. No.: 12/311,231

(22) PCT Filed: Aug. 23, 2007

(86) PCT No.: PCT/JP2007/066373
§ 371 (c)(1),
(2), (4) Date: Mar. 23, 2009

(87) PCT Pub. No.: WO2008/041429
PCT Pub. Date: Apr. 10, 2008

(65) Prior Publication Data
US 2009/0266192 A1  Oct. 29, 2009

(30) Foreign Application Priority Data
Sep. 29, 2006 (JP) .................................. 2006-270092

(51) Int. Cl.
*F16H 63/18* (2006.01)
*F16H 61/32* (2006.01)
*F16H 61/28* (2006.01)

(52) U.S. Cl.
CPC ................ *F16H 63/18* (2013.01); *F16H 61/32* (2013.01); *F16H 2061/2892* (2013.01)

(58) Field of Classification Search
CPC .. F16H 63/18; F16H 2061/2892; F16H 61/32
USPC .............. 999/424.7, 337.5; 74/337.5, 473.12, 74/424.7, 473.36, 473.37; 73/115.02
See application file for complete search history.

(56) References Cited

U.S. PATENT DOCUMENTS

| 44,681 | A | * | 10/1864 | Wappich | 74/424.7 |
| 1,104,736 | A | * | 7/1914 | Schneider | 310/83 |
| 1,341,309 | A | * | 5/1920 | Firestone | 74/424.7 |

(Continued)

FOREIGN PATENT DOCUMENTS

| JP | 58-149278 A | 10/1983 |
| JP | 02093167 A * | 4/1990 |

(Continued)

*Primary Examiner* — Gene Crawford
*Assistant Examiner* — Terry Chau
(74) *Attorney, Agent, or Firm* — Carrier Blackman & Associates, P.C.; William D. Blackman; Joseph P. Carrier (57) ABSTRACT

A shift control device for a vehicle transmission is provided in which drive means for making a shift drum pivot is connected to the shift drum, wherein the drive means (112) includes a power source (113) disposed on at one end, in the axial direction, of the shift drum (104), and a transmission shaft (117) to which power from the power source (113) is transmitted at the one end, in the axial direction, of the shift drum (104), power from the transmission shaft (117) being transmitted to the other end, in the axial direction, of the shift drum (104). This enables an internal combustion engine to be made compact while avoiding a concentrated disposition of the drive means on one side, in the axial direction, of the shift drum.

6 Claims, 8 Drawing Sheets

(56) References Cited

U.S. PATENT DOCUMENTS

| | | | | |
|---|---|---|---|---|
| 2,767,598 | A | * | 10/1956 | Burg ........................... 74/665 Q |
| 3,049,017 | A | * | 8/1962 | McDonald et al. ........... 74/84 R |
| 3,098,398 | A | * | 7/1963 | Ryan .............................. 74/321 |
| 3,495,470 | A | * | 2/1970 | McCartin ........................ 74/425 |
| 5,395,293 | A | * | 3/1995 | Matsuura et al. ............... 477/15 |
| 5,960,670 | A | * | 10/1999 | Iverson et al. ............... 74/337.5 |
| 7,387,042 | B2 | | 6/2008 | Suzuki et al. |
| 7,779,977 | B2 | * | 8/2010 | Chen et al. ................... 192/3.56 |
| 8,015,895 | B2 | * | 9/2011 | Tomoda et al. ............ 74/473.36 |
| 8,037,779 | B2 | * | 10/2011 | Shiozaki et al. ........... 74/473.36 |
| 8,397,596 | B2 | * | 3/2013 | Tomoda et al. .............. 74/337.5 |
| 2002/0152823 | A1 | | 10/2002 | Wild et al. |
| 2006/0162979 | A1 | * | 7/2006 | Usukura et al. ................ 180/230 |
| 2008/0078265 | A1 | * | 4/2008 | Shiozaki et al. ........... 74/473.12 |
| 2008/0156133 | A1 | * | 7/2008 | Chen et al. .................... 74/473.1 |
| 2009/0247358 | A1 | * | 10/2009 | Kojima et al. ................... 477/80 |
| 2010/0000363 | A1 | * | 1/2010 | Tomoda et al. ............ 74/473.36 |

FOREIGN PATENT DOCUMENTS

| | | |
|---|---|---|
| JP | 05-039865 A | 2/1993 |
| JP | 08-035553 A | 2/1996 |
| JP | 2001-050389 A | 2/2001 |
| JP | 2006-017221 | 1/2006 |
| JP | 2006-029420 A | 2/2006 |

* cited by examiner

SHIFT CONTROL DEVICE FOR VEHICLE TRANSMISSION

TECHNICAL FIELD

The present invention relates to a shift control device for a vehicle transmission in which a shift fork for selectively establishing a gear train of multiple shift stages provided between a main shaft to which power from an internal combustion engine is transmitted and a countershaft connected to a driven wheel engages with a lead groove provided in the outer periphery of a shift drum, drive means for making the shift drum pivot being connected to the shift drum.

BACKGROUND ART

Such a shift control device is already known from, for example, Patent Publication 1. Patent Publication 1: Japanese Patent Application Laid-open No. 2006-17221

DISCLOSURE OF INVENTION

Problems to be Solved by the Invention

However, in the arrangement disclosed by Patent Publication 1, an electric motor forming drive means, a reduction gear mechanism, a lost motion mechanism, etc. are disposed in a concentrated manner at one end, in the axial direction, of a shift drum, and an internal combustion engine has large dimensions in some cases.

The present invention has been accomplished in the light of such circumstances, and it is an object thereof to provide a shift control device for a vehicle transmission that enables an internal combustion engine to be made compact while avoiding a concentrated disposition of drive means on one side, in the axial direction, of a shift drum.

Means for Solving the Problems

In order to attain the above object, according to the present invention, there is provided a shift control device for a vehicle transmission in which a shift fork for selectively establishing a gear train of multiple shift stages provided between a main shaft to which power from an internal combustion engine is transmitted and a countershaft connected to a driven wheel engages with a lead groove provided in the outer periphery of a shift drum, drive means for making the shift drum pivot being connected to the shift drum, characterized in that the drive means comprises a power source disposed at one end, in the axial direction, of the shift drum, and a transmission shaft running coaxially and relatively rotatably through the shift drum so that power from the power source is transmitted thereto at the one end, in the axial direction, of the shift drum and being operatively connected to the other end, in the axial direction, of the shift drum, the power source is disposed so as to have a rotational axis thereof perpendicular to the axis of the shift drum, and the transmission shaft is supported on the shift drum. In addition, the drive means further comprises a barrel cam rotating around an axis parallel to the rotational axis of the power source as a result of transmission of power from the power source and having a cam groove on the outer periphery, and a rotation transmission member operatively connected to the shift drum so as to be capable of rotating around an axis perpendicular to the rotational axis of the barrel cam and provided with a plurality of engagement pins that can selectively engage with the cam groove. Further, a lost motion mechanism is provided between a part, at the other end in the axial direction, of the shift drum and an end part of the transmission shaft on the other end part side of the shift drum, the lost motion mechanism comprising a pin that is provided on the end part side of the transmission shaft so as to be offset from the rotational axis thereof, a transmission member that is secured to the other end of the shift drum and is provided with a transmission projection disposed inward of the pin so as to be offset from the axis of the shift drum, and a clamping spring that has a pair of clamping pieces at opposite ends and is attached to the transmission shaft, the pin and the transmission projection being disposed between the two clamping pieces.

An electric motor 113 of an embodiment corresponds to the power source of the present invention.

Effects of the Invention

In accordance with the above-described aspect of the present invention, since the drive means is arranged so that power from the power source disposed at one end, in the axial direction, of the shift drum is transmitted to the other end, in the axial direction, of the shift drum via the transmission shaft, which runs coaxially and relatively rotatably through the shift drum, it is possible to make the drive means compact, and make the internal combustion engine compact while avoiding a concentrated disposition of the drive means on one side, in the axial direction, of the shift drum.

EXPLANATION OF REFERENCE NUMERALS AND SYMBOLS 26, 27 Main shaft
28 Countershaft
98, 99, 100, 101 Shift fork
104 Shift drum
107, 108, 109, 111 Lead groove
112 Drive means
113 Electric motor, which is power source
115 Rotary cam
116 Rotation transmission member
117 Transmission shaft
118 Lost motion mechanism
G1, G2, G3, G4, G5, G6 Gear train

BEST MODE FOR CARRYING OUT THE INVENTION

A mode for carrying out the present invention is explained below by reference to one embodiment of the present invention shown in the attached drawings.

Embodiment 1

FIG. 1 to FIG. 9 show one embodiment of the present invention.

Figure 1:
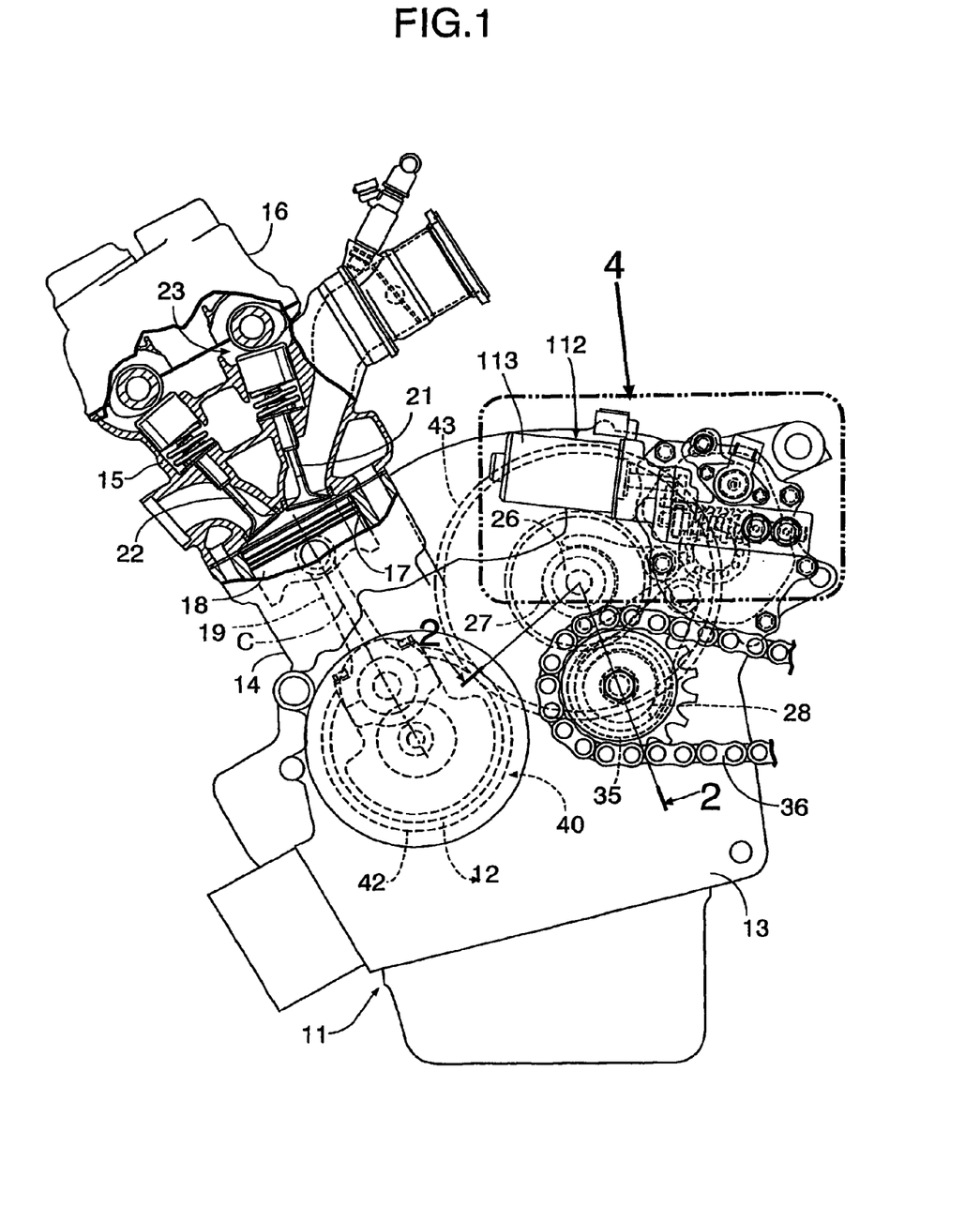
FIG. 1 is a partially cutaway side view of an internal combustion engine (first embodiment).

First, in FIG. 1, this internal combustion engine is mounted in, for example, a motorcycle, and its engine main body 11 includes a crankcase 13 rotatably supporting a crankshaft 12 that runs along the left-and-right direction of the motorcycle, a cylinder block 14 joined to the crankcase 13 and having a cylinder bore 17 into which a piston 18 connected to the crankshaft 12 via a connecting rod 19 is slidably fitted, a cylinder head 15 joined to the cylinder block 14 so as to form a combustion chamber 20 between itself and the cylinder block 14, and a head cover 16 joined to the cylinder head 15, the top of the piston 18 facing the combustion chamber 20. An axis C of the cylinder bore 17 slopes up to the front when mounted in the motorcycle, and a valve operating system 23 for opening and closing an intake valve 21 and an exhaust valve 22 disposed in the cylinder head 15 so that they can open and close is housed between the cylinder head 15 and the head cover 16.

Figure 2:
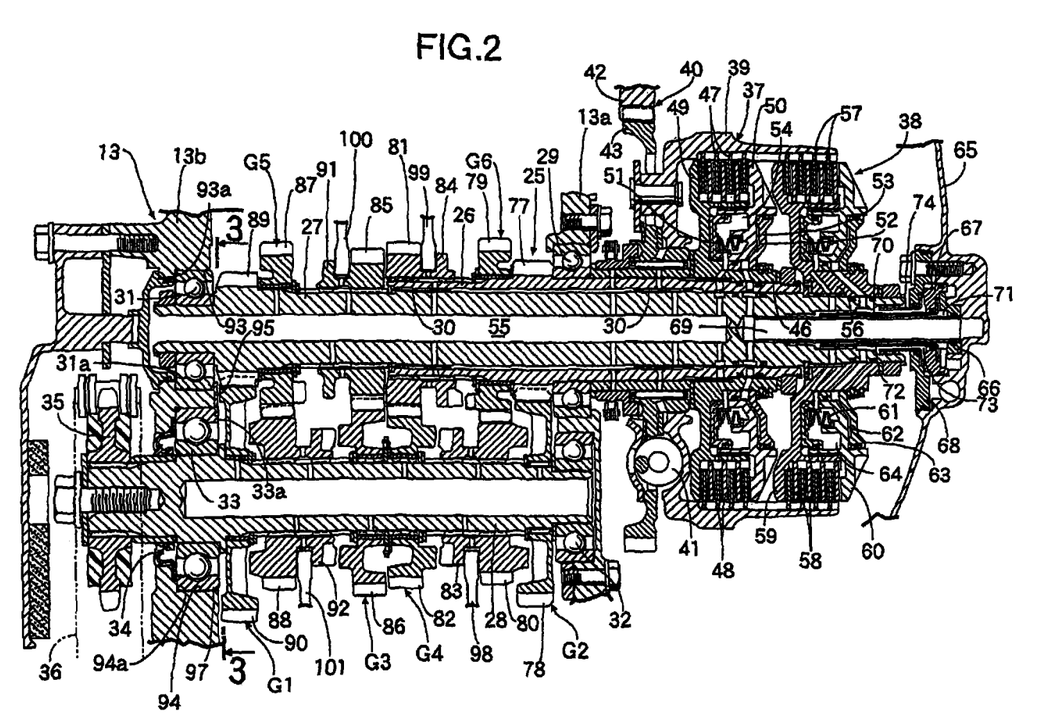
FIG. 2 is a sectional view along line 2-2 in FIG. 1. (first embodiment)

In FIG. 2, housed within the crankcase 13 are a gear shift mechanism 25 equipped with multiple shift stage gear trains that can be selectively established, for example, first to fourth speed gear trains G1, G2, G3, G4, G5, and G6, the gear shift mechanism 25 being formed by providing the second, fourth, and sixth speed gear trains G2, G4, and G6 between a first main shaft 26 and a countershaft 28 connected to a rear wheel, which is not illustrated, and providing the first, third, and fifth speed gear trains G1, G3, and G5 between the countershaft 28 and a second main shaft 27 running coaxially and relatively rotatably through the first main shaft 26.

The crankcase 13 includes a pair of side walls 13a and 13b facing each other across a gap in a direction along the axis of the crankshaft 12, and a middle section of the first main shaft 26, which is formed in a cylindrical shape having an axis parallel to the crankshaft 12, runs rotatably through the side wall 13a with a ball bearing 29 disposed between the side wall 13a and the first main shaft 26. Furthermore, the second main shaft 27, whose axis is parallel to the crankshaft 12, runs relatively rotatably through the first main shaft 26 while keeping its position in the axial direction relative to the first main shaft 26 constant, and a plurality of needle bearings 30 are disposed between the first main shaft 26 and the second main shaft 27. Furthermore, another end part of the second main shaft 27 is rotatably supported on the side wall 13b of the crankcase 13 via a main shaft side ball bearing 31.

One end part of the countershaft 28, which contains an axis parallel to the crankshaft 12, is rotatably supported on the side wall 13a via a ball bearing 32, the other end part of the countershaft 28 runs rotatably through the side wall 13b with a countershaft side ball bearing 33 and an annular seal member 34 disposed between itself and the side wall 13b, and a drive sprocket 35 is fixed to an end part of the countershaft 28 projecting from the side wall 13b so that a chain 36 for transmitting power to the rear wheel, which is not illustrated, is wrapped around the drive sprocket 35.

A first clutch 37 is provided between one end part of the first main shaft 26 and the crankshaft 12 of the internal combustion engine, and a second clutch 38 is provided between one end part of the second main shaft 27 and the crankshaft 12. Power from the crankshaft 12 is inputted into a clutch outer 39, which is common to the first and second clutches 37 and 38, via a primary reduction gear 40 and a damper spring 41. The primary reduction gear 40 is formed from a drive gear 42 provided on the crankshaft 12, and a driven gear 43 relatively rotatably supported on the first main shaft 26 and meshing with the drive gear 42, and the driven gear 43 is connected to the clutch outer 39 via the damper spring 41.

The first clutch 37 includes the clutch outer 39, a first clutch inner 46 coaxially surrounded by the clutch outer 39 and relatively non-rotatably connected to the first main shaft 26, a plurality of first friction plates 47 that relatively non-rotatably engage with the clutch outer 39, a plurality of second friction plates 48 that relatively non-rotatably engage with the first clutch inner 46 and are disposed alternately with the first friction plates 47, a first pressure-receiving plate 49 provided on the first clutch inner 46 so as to face the first and second friction plates 47 and 48, which are disposed so as to overlap each other, a first piston 50 sandwiching the first and second friction plates 47 and 48 between itself and the first pressure-receiving plate 49, and a first spring 51 that urges the first piston 50.

An end wall member 53 forming a first hydraulic chamber 52 between itself and the first piston 50 is fixedly disposed on the first clutch inner 46, a back face of the first piston 50 facing the first hydraulic chamber 52, and the first piston 50 operating so as to clamp the first and second friction plates 47 and 48 between itself and the first pressure-receiving plate 49 in response to an increase in hydraulic pressure of the first hydraulic chamber 52, thereby making the first clutch 37 attain a connected state in which power that has been transmitted from the crankshaft 12 to the clutch outer 39 is transmitted to the first main shaft 26. Furthermore, a canceller chamber 54 is formed between the first clutch inner 46 and the first piston 50, a front face of the first piston 50 facing the canceller chamber 54, and the first spring 51 being housed in the canceller chamber 54 so as to exhibit a spring force toward the side on which the volume of the first hydraulic chamber 52 decreases.

Moreover, the canceller chamber 54 communicates with a first oil passage 55 provided in, and coaxially with, the second main shaft 27 in order to supply lubricating oil between the first and second main shafts 26 and 27 and to lubrication sections of the gear reduction mechanism 26. Therefore, even if centrifugal force accompanying rotation acts on the oil of the first hydraulic chamber 52 in a reduced pressure state to thus generate a force that pushes the first piston 50, since centrifugal force also acts on the oil of the canceller chamber 54 in the same manner, the occurrence of a state in which the first piston 50 undesirably moves to the side on which the first and second friction plates 47 and 48 are held between itself and the first pressure-receiving plate 49 can be avoided.

The second clutch 38 is disposed side by side with the first clutch 37 so as to sandwich the first clutch 37 between itself and the primary reduction gear 40, and includes the clutch outer 39, a second clutch inner 56 surrounded coaxially by the clutch outer 39 and relatively non-rotatably joined to the second main shaft 27, a plurality of third friction plates 57 that relatively non-rotatably engage with the clutch outer 39, a plurality of fourth friction plates 58 that relatively non-rotatably engage with the second clutch inner 56 and are disposed alternately with the third friction plates 57, a second pressure-receiving plate 59 provided on the second clutch inner 56 so as to face the third and fourth friction plates 57 and 58, which are disposed so as to overlap each other, a second piston 60 sandwiching the third and fourth friction plates 57 and 58 between itself and the second pressure-receiving plate 59, and a second spring 61 urging the second piston 60.

An end wall member 63 forming a second hydraulic chamber 62 between itself and the second piston 60 is fixedly disposed on the second clutch inner 56, a back face of the second piston 60 facing the second hydraulic chamber 62, and the second piston 60 operating so as to clamp the third and fourth friction plates 57 and 58 between itself and the second pressure-receiving plate 59 in response to an increase in hydraulic pressure of the second hydraulic chamber 62, thereby making the second clutch 38 attain a connected state in which power that has been transmitted from the crankshaft 12 to the clutch outer 39 is transmitted to the second main shaft 27. Furthermore, a canceller chamber 64 is formed between the second clutch inner 56 and the second piston 60, a front face of the second piston 60 facing the canceller chamber 64, and the second spring 61 being housed in the canceller chamber 64 so as to exhibit a spring force toward the side on which the volume of the second hydraulic chamber 62 decreases.

The first and second clutches 37 and 38 are covered by a first cover 65 joined to the crankcase 13, and first, second, and third partition members 66, 67, and 68 are mounted on an inner face side of the first cover 65. A first tubular member 70 is provided between the second main shaft 27 and the first partition member 66, the first tubular member 70 forming a first hydraulic pressure supply route 69 communicating with the first hydraulic chamber 52 of the first clutch 37, a second tubular member 72 is provided between the second main shaft 27 and the second partition member 67, the second tubular member 72 coaxially surrounding the first tubular member 70 so as to form between itself and the first tubular member 70 an annular second oil passage 71 communicating with the canceller chamber 64 of the second clutch 38, and a third tubular member 74 is provided between the second main shaft 27 and the third partition member 68, the third tubular member 74 coaxially surrounding the second tubular member 72 so as to form between itself and the second tubular member 72 an annular second hydraulic pressure supply route 73 communicating with the second hydraulic chamber 62.

The first and second hydraulic pressure supply routes 69 and 73 are connected to a hydraulic pressure control system, which is not illustrated, and by controlling by means of the hydraulic pressure control system the hydraulic pressure of the first and second hydraulic pressure supply routes 69 and 73, that is, the first and second hydraulic chambers 52 and 62, switching between connection and disconnection of the first and second clutches 37 and 38 is controlled.

The fourth speed gear train G4, the sixth speed gear train G6, and the second speed gear train G2 are provided between the first main shaft 26 and the countershaft 28 so as to be arranged in sequence from the opposite side to the first and second clutches 37 and 38. The second speed gear train G2 is formed from a second speed drive gear 77 that is provided integrally with the first main shaft 26, and a second speed driven gear 78 that is relatively rotatably supported on the countershaft 28 and meshes with the second speed drive gear 77, the sixth speed gear train G6 is formed from a sixth speed drive gear 79 that is relatively rotatably supported on the first main shaft 26, and a sixth speed driven gear 80 that is relatively non-rotatably supported on the countershaft 28 while being capable of moving in the axial direction and that meshes with the sixth speed drive gear 79, and the fourth speed gear train G4 is formed from a fourth speed drive gear 81 that is relatively non-rotatably supported on the first main shaft 26 while being capable of moving in the axial direction, and a fourth speed driven gear 82 that is relatively rotatably supported on the countershaft 28 and meshes with the fourth speed drive gear 81.

A first shifter 83 is relatively non-rotatably and axially movably supported on the countershaft 28 between the second speed driven gear 78 and the fourth speed driven gear 82, the first shifter 83 being capable of switching between a state in which it engages with the second speed driven gear 78, a state in which it engages with the fourth speed driven gear 82, and a state in which it does not engage with either the second speed driven gear 78 or the fourth speed driven gear 8, and the sixth speed driven gear 80 being integrally provided with the first shifter 83. Furthermore, the fourth speed drive gear 80 is provided integrally with a second shifter 84 relatively non-rotatably and axially movably supported on the first main shaft 26, and the second shifter 84 is capable of switching between engagement with and disengagement from the sixth speed drive gear 79.

Engaging the first shifter 83 with the second speed driven gear 78 in a state in which the second shifter 84 is not engaged with the sixth speed drive gear 79 establishes the second speed gear train G2, engaging the first shifter 83 with the fourth speed driven gear 82 in a state in which the second shifter 84 is not engaged with the sixth speed drive gear 79 establishes the fourth speed gear train G4, and engaging the second shifter 84 with the sixth speed drive gear 79 when the first shifter 83 is in a neutral state establishes the sixth speed gear train G6.

The first speed gear train G1, the fifth speed gear train G5, and the third speed gear train G3 are provided so as to be arranged in order from the opposite side to the first and second clutches 37 and 38 between the countershaft 28 and a portion of the second main shaft 27 projecting from the other end part of the first main shaft 26. The third speed gear train G3 is formed from a third speed drive gear 85 that is relatively non-rotatably supported on the second main shaft 27 while being capable of moving in the axial direction, and a third speed driven gear 86 that is relatively rotatably supported on the countershaft 28 and meshes with the third speed drive gear 85, the fifth speed gear train G5 is formed from a third speed drive gear 87 that is relatively rotatably supported on the second main shaft 27, and a third speed driven gear 88 that is relatively non-rotatably supported on the countershaft 28 while being capable of moving in the axial direction and that meshes with the third speed drive gear 87, and the first speed gear train G1 is formed from a first speed drive gear 89 that is provided integrally with the second main shaft 27, and a first speed driven gear 90 that is relatively rotatably supported on the countershaft 28 and meshes with the first speed drive gear 89.

The third speed drive gear 85 is provided integrally with a third shifter 91 that is relatively non-rotatably and axially movably supported on the second main shaft 27, and the third shifter 91 is capable of switching between engagement with and disengagement from the fifth speed drive gear 87. A fourth shifter 92 is relatively non-rotatably and axially movably supported on the countershaft 28 between the third speed driven gear 86 and the first speed driven gear 90, the fourth shifter 92 being capable of switching between a state in which it engages with the third speed driven gear 86, a state in which it engages with the first speed driven gear 90, and a neutral state in which it does not engage with either the third speed driven gear 86 or the first speed driven gear 90, and the fifth speed driven gear 88 being provided integrally with the fourth shifter 92.

Engaging the fourth shifter 92 with the first speed driven gear 90 in a state in which the third shifter 91 is not engaged with the fifth speed drive gear 87 establishes the first speed gear train G1, engaging the fourth shifter 92 with the third speed driven gear 86 in a state in which the third shifter 91 is not engaged with the fifth speed drive gear 87 establishes the third speed gear train G3, and engaging the third shifter 91 with the fifth speed drive gear 87 when the fourth shifter 92 is in a neutral state establishes the fifth speed gear train G5.

Figure 3:
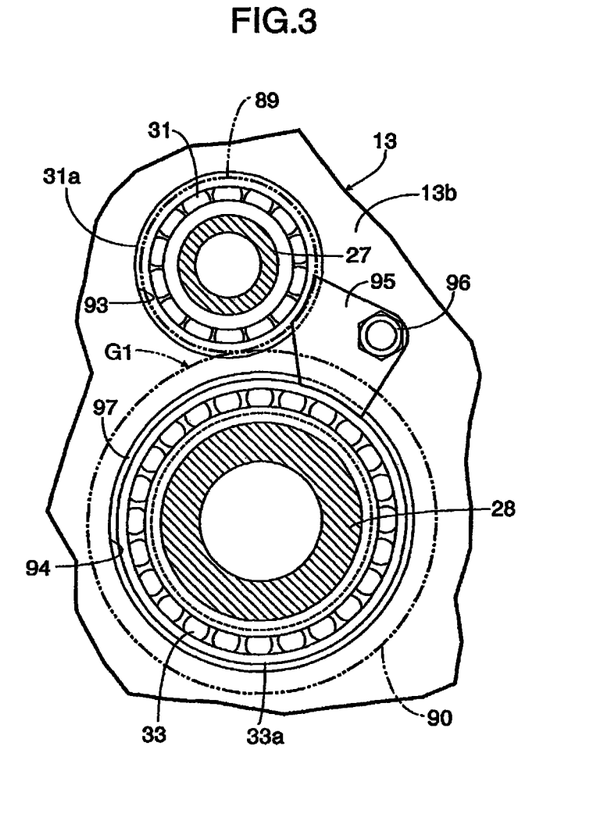
FIG. 3 is a sectional view along line 3-3 in FIG. 2. (first embodiment)

Referring in addition to FIG. 3, an end part of the second main shaft 27 on the opposite side to the first and second clutches 37 and 38 is rotatably supported on the side wall 13b of the crankcase 13 of the engine main body 11 via the main shaft side ball bearing 31, and an outer race 31a of the main shaft side ball bearing 31 is fitted into a support hole 93 provided in the side wall 13b from the inside of the crankcase 13. Moreover, the inner diameter of the support hole 93 and the outer diameter of the outer race 31a are set so as to be larger than the outer diameter of the first speed drive gear 89 provided integrally with the second main shaft 27 so as to form part of the first speed gear train G1.

Moreover, the outer race 31a of the main shaft side ball bearing 31 is held between a step 93a provided on the support hole 93, and a fixing plate 95 fixed to an inner face of the side wall 13b by a bolt 96 and engaging with an outer peripheral part of the outer race 31a.

On the other hand, an end part of the countershaft 28 on the opposite side to the first and second clutches 37 and 38 is rotatably supported on the side wall 13b via the countershaft side ball bearing 33, and an outer race 33a of the countershaft side ball bearing 33 is fitted into a support hole 94 provided in the side wall 13b so that the outer race 33a abuts against a step 94a provided on the support hole 94. The fixing plate 95 also engages with an outer peripheral part of the outer race 33a of the countershaft side ball bearing 33, and the main shaft side ball bearing 31 and the countershaft side ball bearing 33 are fixed to the side wall 13b of the crankcase 13 by the fixing plate 95, which is common to the outer races 31a and 33a.

Moreover, part of the countershaft side ball bearing 33 projects slightly from an inner face of the side wall 13b, the fixing plate 95 engages with an annular recess 97 provided on the outer periphery of a portion of the countershaft side ball bearing 33 projecting from the side wall 13b, and the fixing plate 95 does not protrude inward from an inner end face of the countershaft side ball bearing 33.

The first to fourth shifters 83, 84, 91, and 92 are rotatably retained by first to fourth shift forks 98, 99, 100, and 101, and by driving these shift forks 98 to 101 in the axial direction of the two main shafts 26 and 27 and the countershaft 28, the first to fourth shifters 83, 84, 91, and 92, respectively, may be caused to move in the axial direction.

Figure 4:
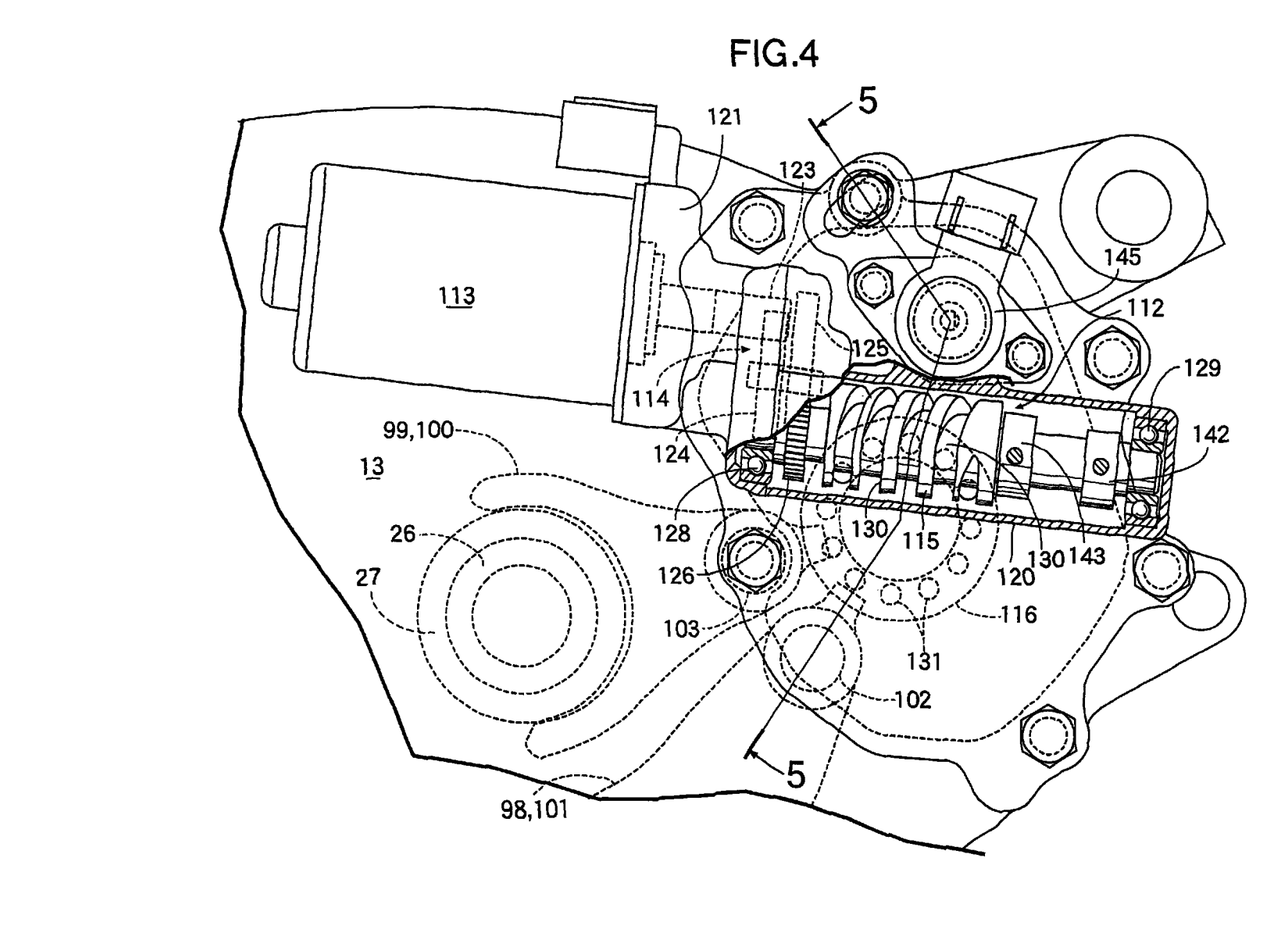
FIG. 4 is a partially cutaway enlarged view of part shown by arrow 4 in FIG. 1. (first embodiment)
Figure 5:
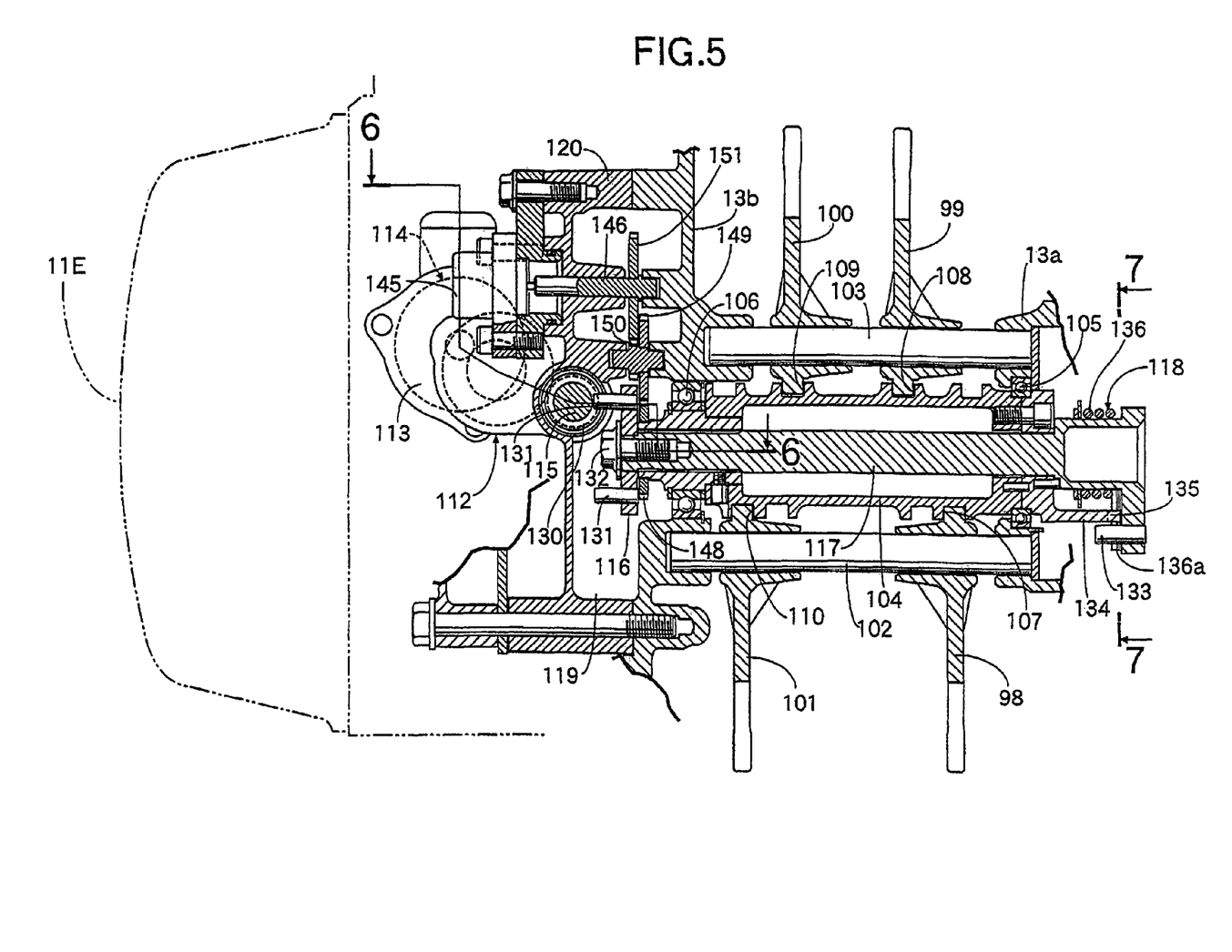
FIG. 5 is a sectional view along line 5-5 in FIG. 4. (first embodiment)

In FIG. 4 and FIG. 5, the first and fourth shift forks 98 and 101 retaining the first and fourth shifters 83 and 92 are slidably supported on a first shift shaft 102 having an axis parallel to the axes of the two main shafts 26 and 27 and the countershaft 28 and having opposite ends supported on the two side walls 13a and 13b of the crankcase 13, and the second and third shift forks 99 and 100 retaining the second and third shifters 84 and 91 are slidably supported by a second shift shaft 103 having an axis parallel to the first shift shaft 102 and having opposite ends supported on the two side walls 13a and 13b.

A shift drum 104 containing an axis parallel to the axis of the crankshaft 12, that is, an axis along the left-and-right direction of the motorcycle, is rotatably supported on the two side walls 13a and 13b via ball bearings 105 and 106, and pins 98a, 99a, 100a, and 101a provided on the shift forks 98 to 101 respectively are slidably engaged with first to fourth lead grooves 107, 108, 109, and 110 provided in the outer periphery of the shift drum 104; when the shift drum 104 pivots, each of the shift forks 98 to 101 slides according to the shape of the first to fourth lead grooves 107 to 110.

Figure 6:
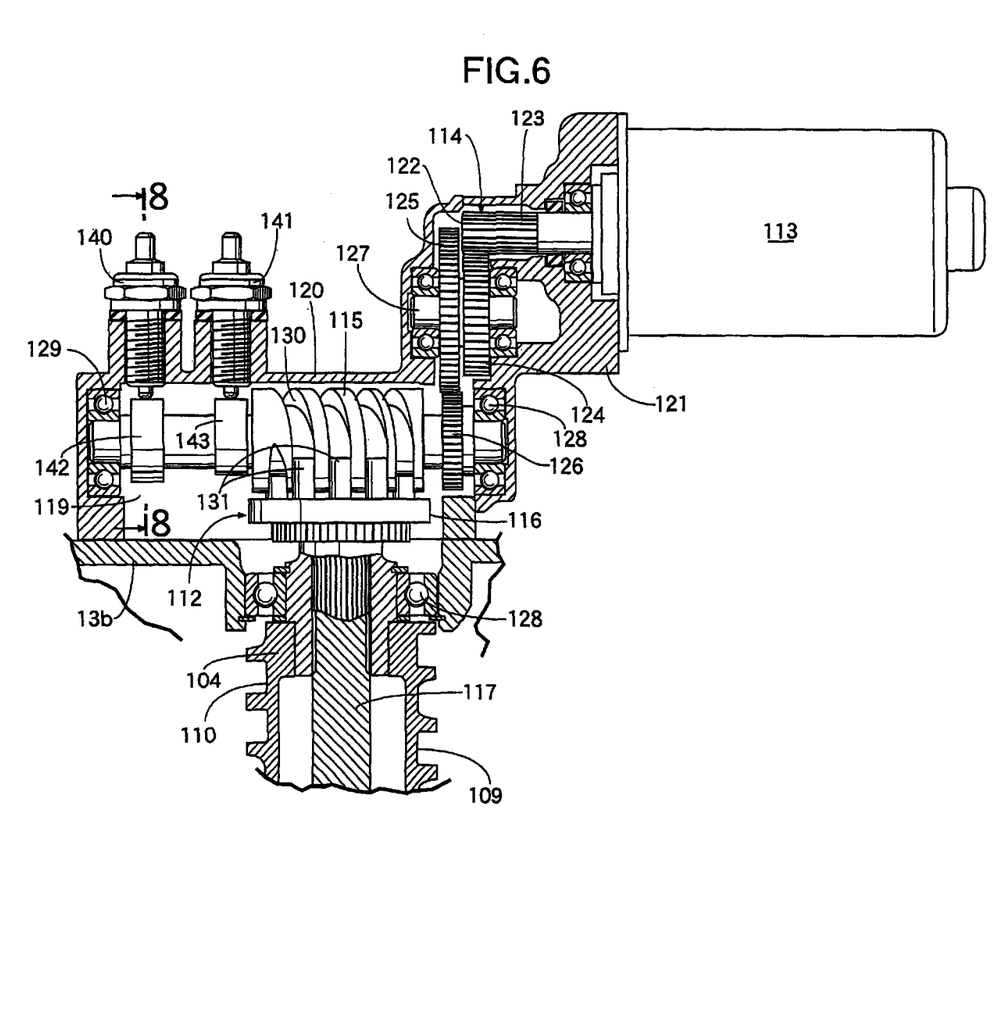
FIG. 6 is a sectional view along line 6-6 in FIG. 5. (first embodiment)

Referring in addition to FIG. 6, the shift drum 104 is pivoted by drive means 112, and this drive means 112 includes an electric motor 113 that is disposed on one side along the axial direction of the shift drum 104, in this embodiment the opposite side to the side on which the first and second clutches 37 and 38 are disposed, and that has a rotational axis in a plane perpendicular to the axis of the shift drum 104; power exerted by the electric motor 113 is transmitted to the other end, in the axial direction, of the shift drum 104 via a reduction gear mechanism 114, a barrel cam 115, a disk-shaped rotation transmission member 116, a transmission shaft 117, and a lost motion mechanism 118, in this embodiment the side of the shift drum 104 on which the first and second drive means 37 and 38 are disposed.

A case member 120 forming between itself and the side wall 13b an operation chamber 119 housing the reduction gear mechanism 114, the barrel cam 115, and the rotation transmission member 116 is secured to an outer face of the side wall 13b of the crankcase 13, and the electric motor 113 is mounted on a cover member 121 mounted on the case member 120 so as to block an open end of the case member 120, such that the motor shaft 122 projects into the operation chamber 119.

The gear reduction mechanism 114 is formed from a drive pinion 123 provided on a motor shaft 122 of the electric motor 113, a first intermediate gear 124 meshing with the drive pinion 123, a second intermediate gear 125 rotating together with the first intermediate gear 124, and a driven gear 126 provided on the barrel cam 115 and meshing with the second intermediate gear 125.

The first and second intermediate gears 124 and 125 are provided on a rotating shaft 127 having opposite end parts rotatably supported by the case member 120 and the cover member 121, and opposite end parts of the barrel cam 115 are rotatably supported on the case member 120 and the cover member 121 via ball bearings 128 and 129.

A helical cam groove 130 is provided on the outer periphery of the barrel cam 115. The rotation transmission member 116 is disposed so as to face the outer periphery of the barrel cam 115 so that it can rotate around the same axis as the shift drum 104, and a plurality of engagement pins 131 are provided at equal intervals in the circumferential direction on the rotation transmission member 116 so that they can selectively engage with the cam groove 130. The plurality of engagement pins 131 engage with the cam groove 130 in sequence in response to rotation of the barrel cam 115 and are fed, thereby transmitting rotational power to the rotation transmission member 116.

One end part of the transmission shaft 117, which runs coaxially and relatively rotatably through the shift drum 104, is coaxially and relatively non-rotatably joined to the rotation transmission member 116 via a bolt 132, and the lost motion mechanism 118 is provided between the other end part of the transmission shaft 117 and the other end part of the shift drum 104.

Figure 7:
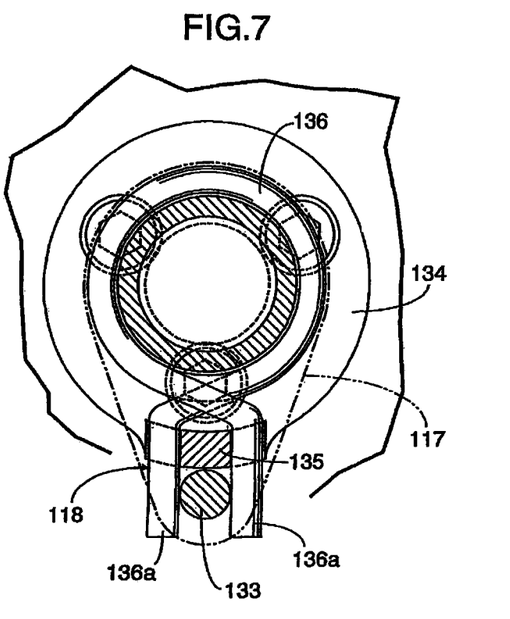
FIG. 7 is an enlarged sectional view along line 7-7 in FIG. 5. (first embodiment)

In FIG. 7, the lost motion mechanism 118 includes a pin 133 that is provided on the other end side of the transmission shaft 117 so as to be offset from the rotational axis thereof, a transmission member 134 that is secured to the other end of the shift drum 104 and is provided with a transmission projection 135 disposed inward of the pin 133 so as to be offset from the axis of the shift drum 104, and a clamping spring 136 that has a pair of clamping pieces 136a and 136a at opposite ends and is attached to the transmission shaft 117, the pin 133 and the transmission projection 135 being disposed between the two clamping pieces 136a and 136a.

When the pin 133 pushes one of the two clamping pieces 136a in a pivoting direction in response to pivoting of the transmission shaft 117, the other clamping piece 136a pushes the transmission projection 135, and a pivoting force due to pivoting of the transmission shaft 117 is transmitted to the shift drum 104 via the lost motion mechanism 118, which generates play.

Figure 8:
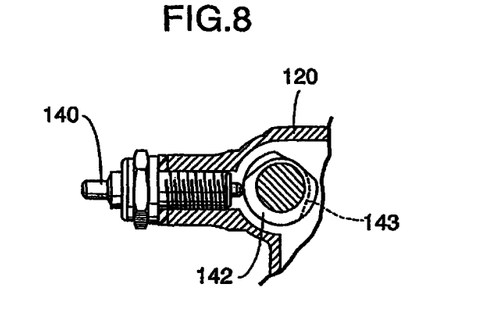
FIG. 8 is a sectional view along line 8-8 in FIG. 6. (first embodiment)

The drive means 112 is arranged so as to pivot the shift drum 104 so that the shift stage changes by only one stage per rotation of the barrel cam 115, and in order to confirm that the barrel cam 115 rotates correctly in response to operation of the electric motor 113, first and second switches 140 and 141 are mounted on the case member 120. As shown in FIG. 8, a first switch cam 142 is provided in a portion, corresponding to the first switch 140, of the barrel cam 115, the first switch cam 142 abutting against the first switch 140 so as to put the first switch 140 in an ON state, and a second switch cam 143 is provided in a portion, corresponding to the second switch 141, of the barrel cam 115, the second switch cam 143 abutting against the second switch 141 so as to put the second switch 141 in an ON state, the first and second switch cams 142 and 143 having an identical shape and being provided on the barrel cam 115 at different phases.

Figure 9:
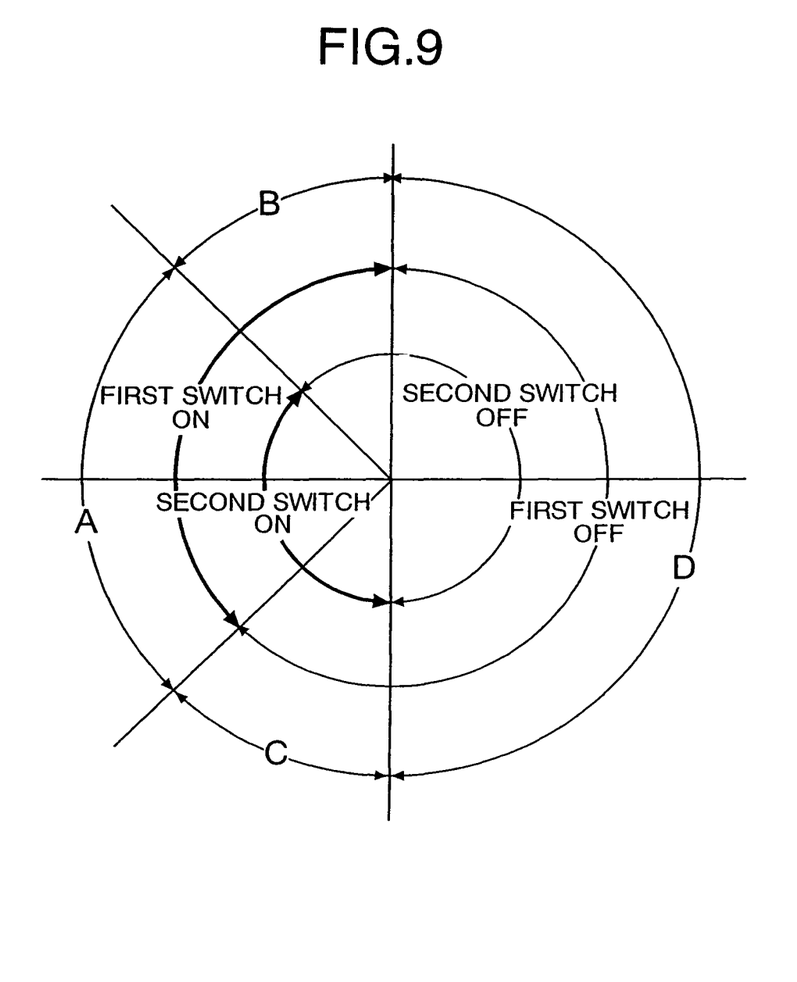
FIG. 9 is a view showing changes of ON/OFF states of first and second switches. (first embodiment)

The ON/OFF states of the first and second switches 140 and 141 change in response to rotation of the barrel cam 115 as shown in FIG. 9; rotation of the barrel cam 115 defines a region A in which the two switches 140 and 141 attain the ON state, a region B in which the first switch 140 attains the ON state and the second switch 141 attains the OFF state, a region C in which the second switch 141 attains the ON state and the first switch 140 attains the OFF state, and a region D in which the two switches 140 and 141 attain the OFF state, and by detecting the ON/OFF states of the first and second switches 140 and 141 the operating status of the barrel cam 115 can be confirmed.

Furthermore, a shift sensor 145 for detecting the pivot position of the shift drum 104 is mounted on the case member 120, and a detection shaft 146 of the shift sensor 145 is rotatably supported by the side plate 13b of the crankcase 13 and the case member 120.

A third intermediate gear 149 meshes with a drive gear 148 rotating together with the shift drum 104, and a driven gear 151 provided on the detection shaft 145 meshes with a fourth intermediate gear 150 rotating together with the third intermediate gear 149.

Such drive means 112 is disposed on the crankcase 13 of the engine main body 11 further inward than the outermost position (portion shown by dotted-dashed line 11E in FIG. 5) of the engine main body 11 in a direction along the axis of the shift drum 104.

The operation of this embodiment is now explained. The drive means 112 pivoting the shift drum 104 includes the electric motor 113 disposed at one end, in the axial direction, of the shift drum 104, and the transmission shaft 117 to which is transmitted power from the electric motor 113 at the one end, in the axial direction, of the shift drum 104; moreover, the transmission shaft 117 runs coaxially and relatively rotatably through the shift drum 104 and, furthermore, an index mechanism formed from the barrel cam 115 and the rotation transmission member 116 and the lost motion mechanism 118 are divided and provided on opposite sides along the axial direction of the shift drum 104. It is therefore possible to make the drive means 112 compact and to avoid a concentrated disposition of the drive means 112 on one side, in the axial direction, of the shift drum 104, thus making the internal combustion engine compact.

Furthermore, since the drive means 112 includes the electric motor 113 disposed so as to have its rotational axis in the plane perpendicular to the axis of the shift drum 104, the barrel cam 115 rotating around the axis parallel to the electric motor 113 as a result of transmission of power from the electric motor 113 and having the cam groove 130 on the outer periphery, and the rotation transmission member 116 operatively connected to the shift drum 104 so as to be capable of rotating around the axis perpendicular to the rotational axis of the barrel cam 115 and provided with the plurality of engagement pins 131 that can selectively engage with the cam groove 130, the power of the electric motor 113 is transmitted to the shift drum 104 side via the barrel cam 115 and the rotation transmission member 116, and it is therefore possible to suppress the amount of the electric motor 113 protruding from the engine main body 11 in a direction along the axis of the shift drum 104, make the drive means 112 compact by disposing the shift drum 104 and the electric motor 113 in proximity to each other, and improve the shift precision.

Moreover, since the axis of the shift drum 104 runs along the left-and-right direction of the motorcycle, it is possible to suppress protrusion of the motorcycle in the width direction and set a relatively large bank angle.

Furthermore, since the drive means 112 is disposed on the engine main body 11 further inward than the outermost position (portion shown by dotted-dashed line 11E in FIG. 5) of the engine main body 11 in a direction along the axis of the shift drum 104, even if the motorcycle falls over, the drive means 112 can be protected by the engine main body 11.

Furthermore, the plurality of gear trains G1, G3, and G5 for odd number stages are provided by disposing the first speed gear train G1 on the opposite side to the first and second clutches 37 and 38 between the countershaft 28 and the second main shaft 27 running coaxially and relatively rotatably through the first main shaft 26, an end part of the second main shaft 27 on the opposite side to the first and second clutches 37 and 38 is rotatably supported on the side wall 13b of the crankcase 13 of the engine main body 11 via the main shaft side ball bearing 31 having a larger diameter than the outer diameter of the first speed drive gear 89, and the outer race 31a of the main shaft side ball bearing 31 is fixed to the side wall 13b by the fixing plate 95 engaging with the outer peripheral part of the outer race 31a.

It is therefore possible to engage the fixing plate 95 with the outer race 31a of the main shaft side ball bearing 31 while preventing the first speed drive gear 89 from interfering with the fixing plate 95 even if it is disposed in proximity to the side wall 13b, it is possible to dispose the first speed drive gear 89 in proximity to the side wall 13b in a direction along the axis of the second main shaft 27, and it is possible to make a transmission device compact in the direction along the axis of the second main shaft 27.

Moreover, since the outer race 33a of the countershaft side ball bearing 33 rotatably supporting on the side wall 13b an end part the countershaft 28 on the opposite side to the first and second clutches 37 and 38 is also fixed to the side wall 13b by the fixing plate 95, the outer races 31a and 33a of the main shaft side ball bearing 31 and the countershaft side ball bearing 33 are fixed to the side wall 13b via the single common fixing plate 95, thus reducing the number of components.

An embodiment of the present invention is explained above, but the present invention is not limited to the above-mentioned embodiment and may be modified in a variety of ways as long as the modifications do not depart from the spirit and scope thereof.

The invention claimed is:

1. A shift control device for a vehicle transmission in which a shift fork, for selectively establishing a gear train of multiple shift stages provided between a main shaft to which power from an internal combustion engine is transmitted and a countershaft connected to a driven wheel, engages with a lead groove provided in the outer periphery of a shift drum,
   a drive mechanism is provided for making the shift drum pivot, said drive mechanism being operatively connected to the shift drum, characterized in that the drive mechanism comprises:
   a hollow case member,
   an electric motor which is operatively attached to the case member and disposed proximate a first end, in the axial direction, of the shift drum,
   a transmission shaft running coaxially and relatively rotatably through the shift drum so that power from the electric motor is transmitted thereto at said first end, in the axial direction, of the shift drum, said transmission shaft being operatively connected to a second end, in the axial direction, of the shift drum,
   a barrel cam rotatably disposed in the case member between the electric motor and the transmission shaft, said barrel cam comprising a shaft having first and second cams affixed thereto, and
   first and second switches operatively attached to the case member and configured and arranged to be activatable by said first and second cams, respectively, upon rotation of said barrel cam, in order to determine whether or not the barrel cam is correctly rotating in response to operation of the electric motor,
   wherein the electric motor is disposed so as to have a rotational axis thereof perpendicular to the axis of the shift drum, and the transmission shaft is supported on the shift drum,
   and wherein the electric motor has its rotational axis disposed parallel to the rotational axis of the barrel cam.

2. The shift control device for the vehicle transmission according to claim 1, wherein the barrel cam is operable to rotate around an axis parallel to the rotational axis of the electric motor as a result of transmission of power from the electric motor, said barrel cam having a cam groove on the outer periphery thereof, and further comprising a rotation transmission member operatively connected to the shift drum so as to be capable of rotating around an axis perpendicular to the rotational axis of the barrel cam and provided with a plurality of engagement pins that can selectively engage with the cam groove.

3. The shift control device for the vehicle transmission according to claim 1, wherein a lost motion mechanism is provided between a part, at the second end in the axial direction, of the shift drum and an end part of the transmission shaft on the second end of the shift drum, the lost motion mechanism comprising a pin that is provided on said end part side of the transmission shaft so as to be offset from the rotational axis thereof, a transmission member that is secured to the other end of the shift drum and is provided with a transmission projection disposed inward of the pin so as to be offset from the axis of the shift drum, and a clamping spring that has a pair of clamping pieces at opposite ends and is attached to the transmission shaft, and the pin and the transmission projection being disposed between the two clamping pieces.

4. A shift control device for a vehicle transmission in which a shift fork, for selectively establishing a gear train of multiple shift stages provided between a main shaft to which power from an internal combustion engine is transmitted and a countershaft connected to a driven wheel, engages with a lead groove provided in the outer periphery of a shift drum, a drive mechanism which makes the shift drum pivot being connected to the shift drum,
   wherein the drive mechanism comprises:
   an electric motor disposed proximate a first end, in the axial direction, of the shift drum,
   a hollow case member,
   a barrel cam rotatable around a rotational axis parallel to a rotational axis of the electric motor as a result of transmission of power from the electric motor, and having a cam groove formed in the outer surface thereof, a portion of said barrel cam housed in the hollow case member,
   a rotation transmission member housed in the hollow case member and operatively connected to the shift drum so as to be capable of rotating around an axis perpendicular to the rotational axis of the barrel cam, said rotation transmission member comprising a substantially disc-shaped plate having a flattened surface and provided with a plurality of substantially cylindrical engagement pins extending outwardly from the flattened surface of the plate and configured to selectively engage with the cam groove, and
   a transmission shaft running coaxially and relatively rotatably through the shift drum so that power from the electric motor is transmitted thereto at said first end, in the axial direction, of the shift drum and being operatively connected to a second end, in the axial direction, of the shift drum, one end of the transmission shaft protruding from a case in which the shift drum is accommodated, the rotation transmission member being connected to the protruding end of the transmission shaft,
   a reduction gear mechanism that connects between the electric motor and the barrel cam, and
   a shift sensor for detecting a pivot position of the shift drum, a portion of said shift sensor disposed in a space defined between the case member and the case,
   wherein the electric motor is disposed so as to have the rotational axis thereof oriented perpendicular to the axis of the shift drum, and the transmission shaft is supported on the shift drum.

5. The shift control device for the vehicle transmission according to claim 4, wherein a lost motion mechanism is provided between a part, at the second end in the axial direction, of the shift drum and an end part of the transmission shaft on the second end of the shift drum, the lost motion mechanism comprising a pin that is provided on said second end of the transmission shaft so as to be offset from the rotational axis thereof, a transmission member that is secured to the second end of the shift drum and is provided with a transmission projection disposed inward of the pin so as to be offset from the axis of the shift drum, and a clamping spring that has a pair of clamping pieces at opposite ends and is attached to the transmission shaft, and the pin and the transmission projection being disposed between the two clamping pieces.

6. The shift control device for the vehicle transmission according to claim 4, further comprising a gear reduction mechanism interconnecting the electric motor and the barrel cam, said gear reduction mechanism comprising:
   a drive pinion provided on a motor shaft of the electric motor;
   a first intermediate gear meshing with the drive pinion;
   a second intermediate gear joined to and rotating together with the first intermediate gear;
   and a driven gear affixed to the barrel cam and meshing with the second intermediate gear.

* * * * *